US010239393B2

(12) United States Patent
Held (10) Patent No.: US 10,239,393 B2
(45) Date of Patent: Mar. 26, 2019

(54) ROOF-CANOPY, MULTI-FUNCTION ROOF-CANOPY SUPPORTS, AND REAR-CANOPY FOR A GOLF CART

(71) Applicant: Michael P. Held, Orchard Park, NY (US)

(72) Inventor: Michael P. Held, Orchard Park, NY (US)

(*) Notice: Subject to any disclaimer, the term of this patent is extended or adjusted under 35 U.S.C. 154(b) by 0 days.

(21) Appl. No.: 15/728,156

(22) Filed: Oct. 9, 2017

(65) Prior Publication Data

US 2018/0099548 A1 Apr. 12, 2018

Related U.S. Application Data

(60) Provisional application No. 62/406,643, filed on Oct. 11, 2016.

(51) Int. Cl.

| B62D 25/06 | (2006.01) |
|---|---|
| B60J 7/10 | (2006.01) |
| B60J 7/20 | (2006.01) |
| B62D 25/04 | (2006.01) |
| B60R 9/04 | (2006.01) |
| B62D 25/02 | (2006.01) |

(Continued)

(52) U.S. Cl.
CPC ............. *B60J 7/106* (2013.01); *B60J 5/0487* (2013.01); *B60J 7/20* (2013.01); *B60R 9/04* (2013.01); *B60R 9/065* (2013.01); *B62D 25/02* (2013.01); *B62D 25/04* (2013.01); *B60J 7/0084* (2013.01); *B60Y 2200/23* (2013.01)

(58) Field of Classification Search
CPC .. B60J 7/106; B60J 7/0084; B60J 7/20; B60R 9/04; B60R 9/065; B62D 25/02; B62D 25/04; B62D 25/06; B60Y 2200/23
USPC .................................................. 296/102, 77.1
See application file for complete search history.

(56) References Cited

U.S. PATENT DOCUMENTS

| 5,259,656 A | * | 11/1993 | Carroll | ................... B60J 11/00 150/159 |
| 5,429,404 A | * | 7/1995 | King, Sr. | ............... B60J 5/0487 160/349.1 |

(Continued)

*Primary Examiner* — Gregory A Blankenship
(74) *Attorney, Agent, or Firm* — Vincent G. LoTempio; Kloss, Stenger & LoTempio; David T. Stephenson (57) ABSTRACT

A body-panel golf-cart having multi-functional canopy-supports, a roof-canopy having U-type storage-channels about its periphery, and a lower body-panel. The multi-functional roof-canopy back-supports are either sited in-line with the cart's structural struts or encompass the structural struts to widen the space between the supports providing an enlarged space between the rear supports for viewing and storage. Roof-canopy and roof-canopy back-supports are formed as a one piece unit with a lower body-panel that extends from the rear-most of cart to under the seat providing a streamlined cart with more storage capacity. Increased roof-canopy storage space offers out-of-the-way positioning of cart's side protective-enclosure brackets and rollers and out-of-the-way storage of the protective-enclosures when undeployed. Roof-supports offer tight closure for side protective-enclosures and space for cooler and sand and seed box. Rear-canopy is stored in roof-canopy back-supports and space under roof-canopy and secured using magnets. Roof water drains through conduits in roof and supports.

20 Claims, 7 Drawing Sheets

(51) Int. Cl.
*B60R 9/06* (2006.01)
*B60J 5/04* (2006.01)
*B60J 7/00* (2006.01)

(56) References Cited

U.S. PATENT DOCUMENTS

| | | | | |
|---|---|---|---|---|
| 5,921,609 | A * | 7/1999 | Mills | B60J 5/0487 296/138 |
| 7,740,300 | B2 * | 6/2010 | Marsh | B60J 5/0487 296/77.1 |
| 8,668,242 | B2 * | 3/2014 | Sobik | B60J 7/0007 160/25 |
| 9,248,724 | B1 * | 2/2016 | Judisch | B60J 5/0487 |
| 2006/0163905 | A1 * | 7/2006 | Held | B62D 33/06 296/102 |
| 2006/0284442 | A1 * | 12/2006 | Tyrer | B60J 7/1278 296/102 |
| 2007/0257508 | A1 * | 11/2007 | Ball | B62D 33/0621 296/102 |
| 2011/0001330 | A1 * | 1/2011 | Hirneise | B60J 5/065 296/77.1 |
| 2018/0099548 | A1 * | 4/2018 | Held | B60R 9/065 |

\* cited by examiner

ROOF-CANOPY, MULTI-FUNCTION ROOF-CANOPY SUPPORTS, AND REAR-CANOPY FOR A GOLF CART

CROSS-REFERENCE TO RELATED APPLICATIONS

This is a Non-Provisional Application of Provisional Application 62/406,643 filed on Oct. 11, 2016.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

INTRODUCTION

The present invention relates generally to open-air vehicles, such as golf-carts, and, more particularly, to a golf-cart designed with a roof-canopy having extended under-canopy storage space and roof-canopy supports/body-panel that serve multi-functions including rear-canopy storage and space for additional integrated accessories.

BACKGROUND

The background information discussed below is presented to better illustrate the novelty and usefulness of the present invention. This background information is not admitted prior art.

The use of open-air carts, often referred to as NEVs (Neighborhood Electric Vehicles), is growing exponentially. Entire communities are being designed to integrate these carts. One example is Peachtree City, Ga., a town of 35,000, where most every family has a low-speed, low-carbon producing vehicle. About 10,000 of these carts are roaming the 90 miles of cart-compatible paths for people to pick up groceries, take kids to school, and doing all the short trips that make up so much of our daily driving. Another example is the Villages in Sumter County, Fla., which increased its population of 8,333 at the 2000 census by 517.33% census to 51,442 by the 2010 census. Many drivers now refer to their open-air golf-carts as "their second car" that is used not only within the village, but outside of the village as well, to drive to shopping centers and medical facilities, on nearby highways.

Such open-air carts are now street-legal in at least 45 states, which means that they are driven under a variety of weather conditions ranging from very warm to very cold, windy, rainy, and even snowy. Thus, open-air cars typically now come with a canopy and a windshield. Also available as accessories are side and rear protective-enclosures to shelter the occupants and the interior of the car from the elements, including wind, cold, snow, and rain. Although all currently available hand-roll enclosures use various means of securing their protective-enclosures to the cart, such as by means of either a zipper, hook and loop, snaps or a combination of these, including securing the bottom edge to the cart with snaps or hooks, these attachment means are not tight. There are gaps between each set of attachment means that allow wind and elements of the weather to enter the cart. Because currently available protective-enclosures are only available as accessories, they must be attached to the cart along with the attachment means discussed above.

The type of open-air cart with which the example of this invention is concerned comes with a roof (also referred to as a canopy or a roof-canopy) to protect both the cart's passengers and the interior of the cart from the effects of the elements. In addition to a protective roof-canopy, protective-enclosures are added to cover the side openings on a cart, as needed. Most carts include a rear storage compartment used to hold a golf-bag and clubs, as well as other gear such as sweater boxes, coolers, and seed boxes. When the rear compartment is designed for the storage of golf-bags, the rear-canopy protective-enclosure is often referred to as a bag-cover, with a Club Protector® canopy being a prime example. The rear-canopy can be opened to access the contents carried in the rear compartment and closed when the cart is not in use.

SUMMARY

The present Inventor realized that by taking advantage of under-utilized space in the canopy and redesigning the back roof-canopy supports, multiple innovations could be made. Accordingly, the present Inventor's inventive concept materialized into the most functional and most stream-lined cart on the market. The concept evolved to produce a fully functional roof-canopy and body-panel concept. The design is unique in that the under-utilized space of the roof canopy in currently available carts is now usable space accomplished by designing the roof-canopy to present U-type storage channels about its periphery. This is accomplished by designing the roof-canopy to be either domed, elevated in another desired manner, or simply having the periphery of the roof-canopy raised so that now there is useful, storage space about all or part of the roof-canopy's periphery. The roof canopy is now supported on multi-functional roof-canopy back supports that are either sited in-line with the cart's structural struts or encompass the structural struts. Siting the roof-canopy back supports either in-line with the cart's structural struts or encompassing the struts results in widening the space between the supports which provides an enlarged space between the rear supports. This increase of space between the roof-canopy back supports provides for an increase in the size of what is considered the rear-window, thus enhancing a driver's rear view and also provides more storage space for golf-bags and the like.

The inventive principles also include front canopy supports in addition to the newly-designed roof-canopy and multi-function roof-canopy back supports. The concept fully contemplates, depending on the structural and stylistic need that the roof-canopy and the roof-canopy back-supports are structural one piece with a lower body-panel that extends from the rear-most of the cart to under the seat giving a contiguous and streamlined look to the cart. This is accomplished by either forming the roof-canopy back-supports and lower body-panel as a single-unit molded piece or by forming the pieces individually and securing them to each other once on the cart. As the ability to mold larger pieces becomes available, the roof, front and back canopy supports, and the body-panel can all be formed as a single unit.

The present Inventor recognized the difficulties encountered when cart passengers are entering or exiting a currently available cart fitted with protective-enclosures. One of the problems come from the brackets that support the protective-enclosure rollers because they either extend down or out or both from the cart's roof-canopy posing a hindrance, at best, and a hazard, at worse, for those entering or exiting the cart. This happens because cart roof-canopies are currently designed to slant downwards at their edges. This design leaves little room under the roof-canopy for either the hardware required to support and store the enclosures and from the rolled-up enclosures themselves as they protrude downwards from beneath the edge of the roof-canopy and must be avoided by those entering or exiting the cart. The inventive design of the roof-canopy eliminates the downward slant of the perimeter edges of the roof-canopy. The perimeter areas of the roof-canopy now are either parallel to the horizontal providing for a channel of space beneath perimeter edges of the roof-canopy or, if desired, domed or otherwise elevated, providing even more space for storage under the periphery of the roof-canopy. This increased storage space within the roof-canopy offers out-of-the-way positioning of the cart's side protective-enclosure brackets and rollers and out-of-the-way storage of the protective-enclosures when they are not is not in use. The protective-enclosures roller supports, which are contemplated to include support structures such as brackets or male/female fitting structure, will no longer pose a hindrance or hazard to those who are entering or exiting the cart. Having the protective-enclosure roller and the protective-enclosures tucked up under the newly designed dome-like canopy also eliminates the need for the off-the-canopy valences that are currently required to cover the undeployed protective-enclosures and their supporting structure. If desired, the protective-enclosures roller's support structure may be a simple receiving aperture formed directly in the frame when the roof-canopy/roof-canopy support assembly is molded.

While currently available protective-enclosures for the driver's and passenger's sides of carts can some provide protection from the elements; the protection is limited as the enclosures are not held taut across the openings they cover. When deployed, the side edges of side protective-enclosures of currently available carts are attached to the cart using various means, such as snaps, magnets, etc. The gaps between each of these attachment means are very susceptible to the entrance of wind, snow, and particularly rain. When the enclosure's attachment gaps are lifted away from the cart by ill-fitting attachment means or by the wind, the interior of the cart and thus the occupants are at the mercy of the effects of the weather. This can be especially troublesome when the cart is in motion subjecting the protective-enclosures to both ambient and motion-caused wind and rain. To alleviate this inconvenience, the inventive concept principles extend to using U-style channels on a forward facing face of the roof-canopy back supports to provide grasping means to hold taut side protective-enclosures when they are deployed. The sides of the side protective-enclosures are treated with closure means, such as, in this example, having cabled edges. The cabled-edges of the side edges of both the front and rear sections of the protective-enclosures fit into accepting canopy-support U-channels 13 and 42 when the protective-enclosure is deployed to secure the enclosure so that it remains taut while in use. U-channels in this design are integrated into the rear-canopy back supports. Depending on the structural design of each cart, the U-channels may be placed into a special canopy-to-cart piping. The available space made possible by the design of the roof-canopy back supports provides for built-in accessories such as a cooler, sand and seed box, and sweater box without sacrificing any golf-bag storage space. The invention also include roof-canopy drainage channels that direct rain or melt water from the roof-canopy to the ground through conduits built into the roof-canopy back supports.

Electrical wiring is also conducted through the cart from the space in the body-panels through the roof-canopy back supports, if desired within the serviceable space under the roof-canopy.

The present Inventor further recognized that while there are rear-canopies protect the golf clubs and other rear accessories of a golf cart, there is no protection for an undeployed rear-canopies. It can be appreciated that when the canopy is in its undeployed position, the folds of the canopy fold downward and inward, analogous to the folding of the material of an umbrella when it is closed. However, the folds that are exposed on the upper end of the folded canopy and especially the spaces between the horizontally positioned folds are prone to collection of various sorts of debris and insects while the ends of the folds that are exposed to the environment are subject to the wearing effects of the sun and ambient moisture. The present inventive concept presents a built-in protective storage space for undeployed rear-canopies. On the rear-ward facing side of each of the roof-canopy back supports there is a U-channel. Complementing and connecting to the two U-channels on the roof-canopy back supports is a space under the roof-canopy. Together these three spaces provide a storage area for the undeployed accordion-folding rear-canopy. Securing the rear-canopy in its storage area is one or more magnets on a rear surface of the roof-canopy. Another magnet is positioned on the lower bar of the accordion-folding rear-canopy so that once the rear-canopy is folded-up into its undeployed position, the two magnets act together to securely hold the rear-canopy in place. Currently available rear-canopies are secured in their undeployed, folded-up condition by means of a hook and loop-type fasteners. Hook and loop fasteners tend to collect bits of debris which eventually limits their usefulness. They also can rub against the material of the rear-canopy which causes wear. Snaps are also used by some currently available canopy styles to secure them while in their undeployed position. The present invention, differs however, in that it is uses a canopy handle/latch that, in the example described, includes a magnet on the rear-canopy and either a mating magnet on the roof-canopy or the metal of the roof-canopy structure to keep the rear-canopy securely closed and another magnet on the flap of the roof canopy that when folded up over the deployed rear-canopy mates with either a magnet on the roof-canopy or on a slip-on roof-cap that is found on some currently available carts. Magnets do not wear out as do hook and loop fasteners and snaps. They also do not harm the cloth of the canopy as can hook and loop fasteners and snaps. It should be understood, that although a magnetic handle/latch is used as an example, it should not limit the claims as other types of latch closure devices are contemplated as well, including only a handle with no latch. In fact, any latch device that will perform the desired function is contemplated, such as a detent, where the detent is on the canopy bar and the mating part on the roof cap or canopy, depending on the model of the cart. That latch could also be a deadbolt latch, a friction latch, spring latches, slam latch, cam lock, Norfolk latch, Suffolk latch, crossbar, cabin hook, or a toggle latch, for example. It must be further be understood that the latch could depend on gravity alone, as when the bottom hinge of the canopy is brought out a bit, then the canopy would automatically, due to gravity lean in a position that would keep it gravitationally stable. In the cases where a latch mechanism is not required, a handle would still be contemplated to assist a user in opening the canopy. In the example of the canopy illustrated here, the flap that hangs from the rear canopy is tucked into the storage space along with the canopy when the rear-canopy is undeployed. Alternative, the flap us stowed under the undeployed rear-canopy. This is accomplished by using mating magnetic fasteners that provide the advantages of being unlikely under normal circumstance to lose their magnetic force, do not rust, and do not negatively affect either the canopy cover or the canopy flap. In this example, one magnetic fastener is sewn into the driver's side area of flap and another magnetic fastener is sewn into the passenger's side area of flap so that when the flap is tucked under the canopy the two magnets will mate with the metal of the roof-canopy frame. With the flap stowed out of sight the area of unobstructed vision out of the rear cart is greatly increased. Moreover, when flap is lifted and stowed, it eases removal of golf clubs from the storage space for golf clubs or of any other items stowed in sweater basket area and having the flap stowed, protects the flap from the wear and tear it can suffer when items are being removed from the rear storage area.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF THE REFERENCE NUMERALS AND PARTS TO WHICH THEY REFER

6 Under the canopy protective-enclosure storage space.
8 Roof-canopy.
10 Open-air cart.
12 Multi-function roof-canopy rear-supports, upper body-panel section.
13 U-channel to hold rear-edge of protective-enclosure.
14 Lower portion of rear roof-canopy-support 12.
15 Upper portion of rear-canopy-support 12.
16 Drainage channel of rear roof-canopy-support 12.
17 Drainage channel opening on roof-canopy 8.
18 Sand and seed box.
20 Cooler.
22 Roller for deploying/undeploying protective-enclosure 24.
24 Protective-enclosure.
24$_F$ Protective-enclosure front-section.
24$_R$ Protective-enclosure rear-section.
26 Rear pull-chain for deploying/undeploying protective-enclosure 24.
28 Cable on edge of protective-enclosure 24.
30 Rear-canopy (bag cover).
31 Storage space for sides edges of rear-canopy 30.
32 Handle/clasp on rear-canopy.
33 Mating handle/clasp on cart frame or on roof cap.
35 Storage space for rear-canopy.
38 Roof-canopy rear light.
40 Front roof-canopy-support structure.
42 U-channel to hold front edge of protective-enclosure.
44 Front pull-chain for deploying/undeploying protective-enclosure 24.
48 Bottom body-panel section
50 Bag storage area.
52 Additional storage area.
54 Lower rear brake light.
56 Protective flap of rear-canopy 30.
58 Golf-bag support surface.
60 Sweater basket area.
62 Connectors to connect bottom edge of protective-enclosure to cart.
64 Zipper closure between front and rear protective-enclosure section.
66 Rear-side edge of rear section 24$_R$.
68 Front-side edge of front section 24$_F$

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms, many of which will be discussed in some detail below. Therefore, the embodiments described herein are provided with the understanding that the present disclosure is intended as illustrative and is not intended to limit the invention to the embodiments described herein.

Figure 1:
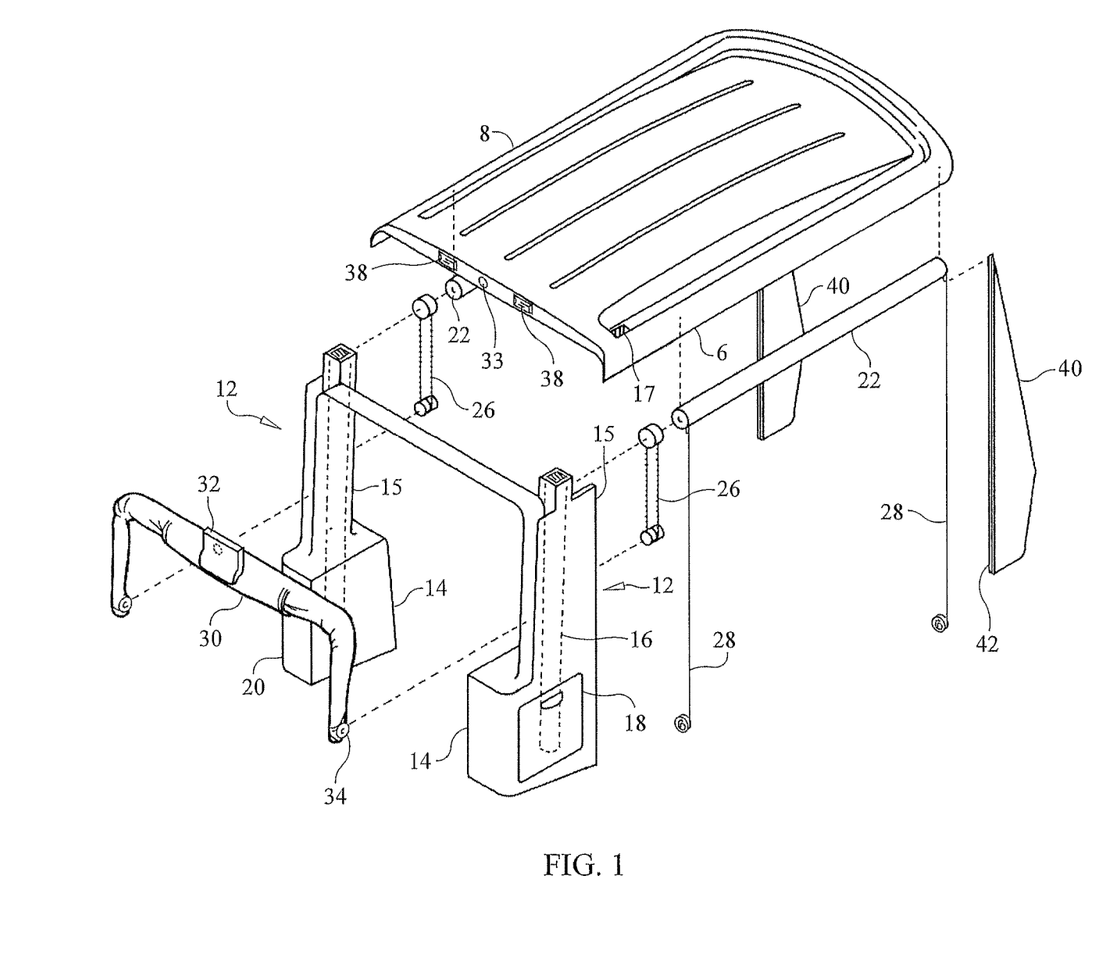
FIG. 1 is an exploded perspective view illustrating an example of a cart roof-canopy, front and rear roof-canopy supports, protective-enclosure rollers with pull chains, canopy drains, and a bag-cover.
Figure 2:
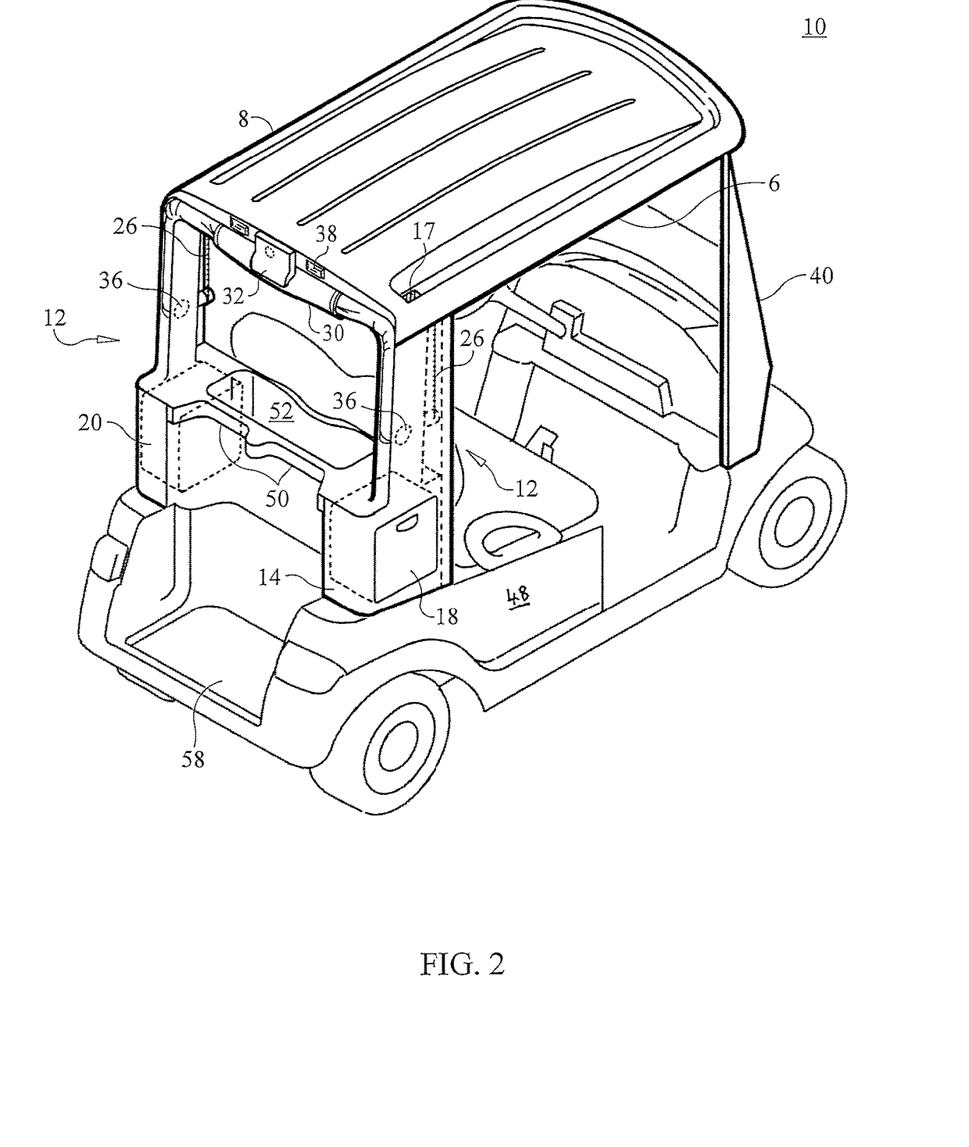
FIG. 2 is a ¾ perspective rear view of a cart with its rear-canopy bag-cover stowed.
Figure 3:
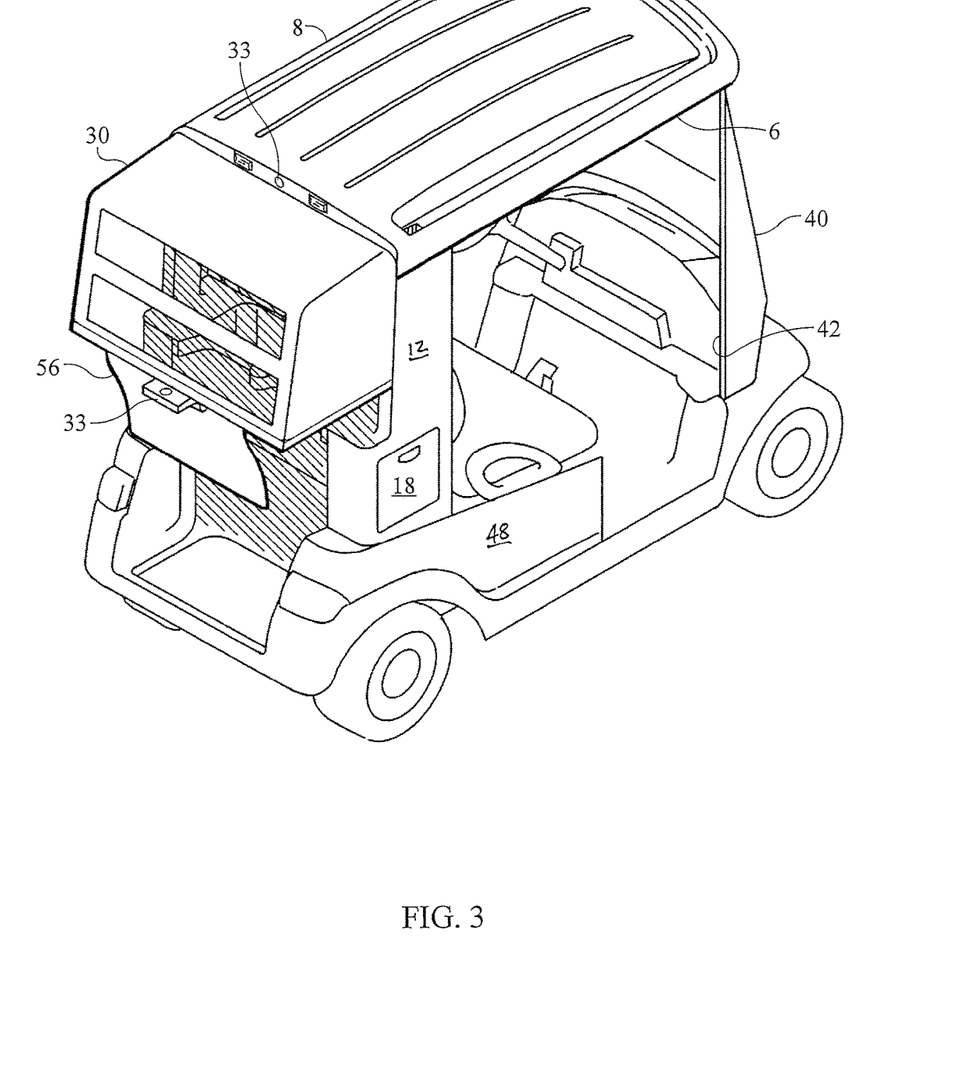
FIG. 3 is a ¾ perspective rear view of a cart with its rear-canopy bag-cover open for use.
Figure 4:
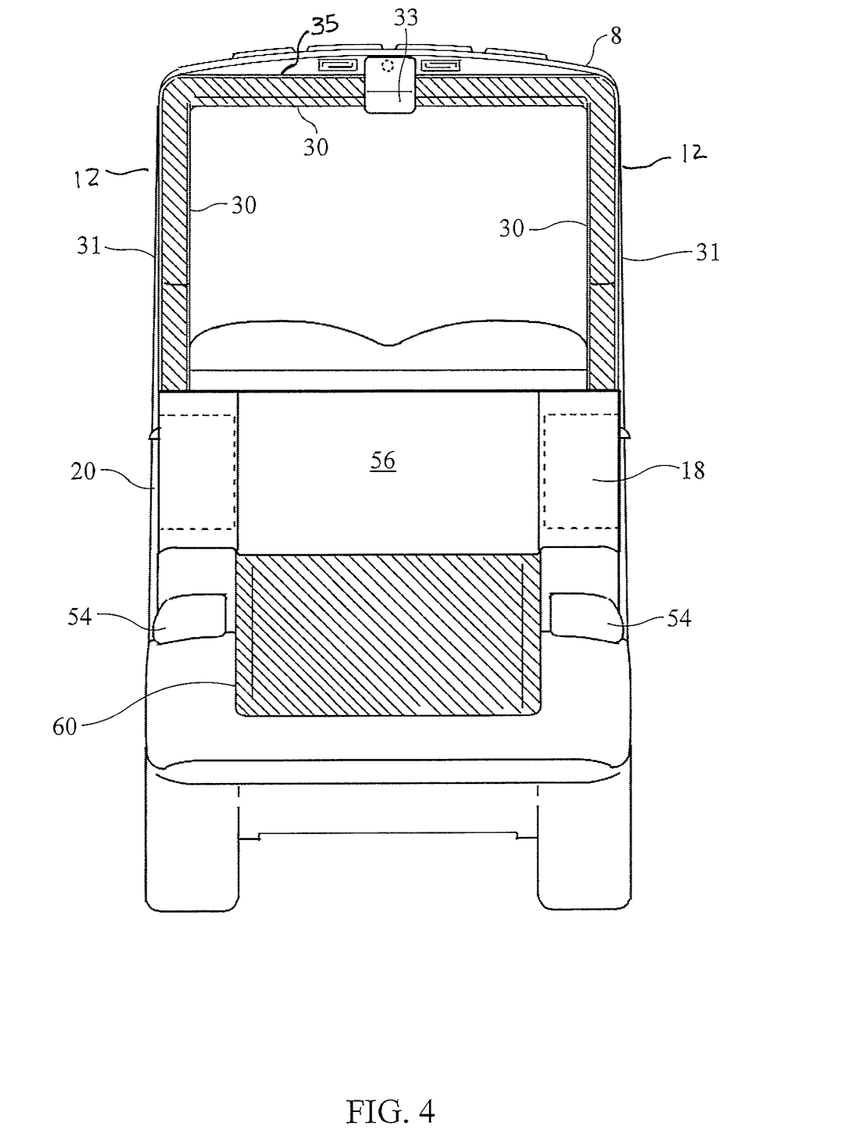
FIG. 4 is a rear elevation view of a cart with its rear-canopy bag-cover stowed.
Figure 5:
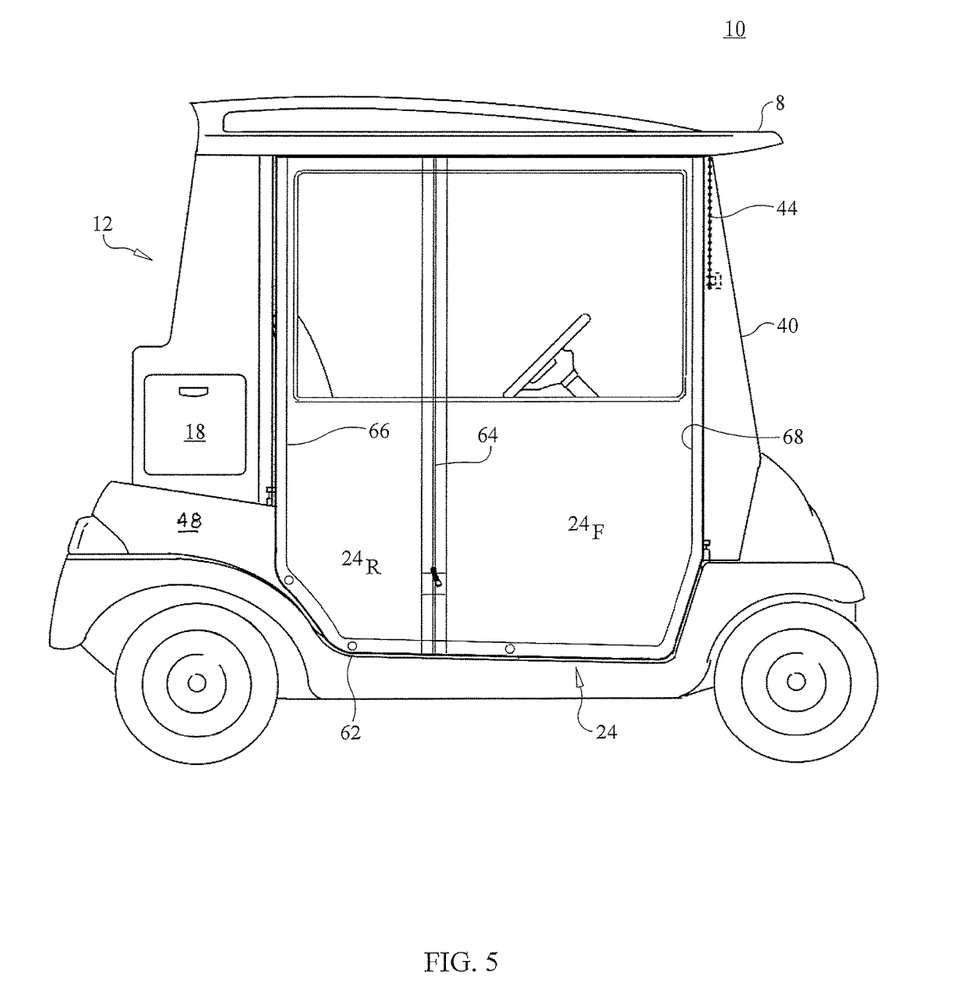
FIG. 5 is a side elevation view of a cart with its protective-enclosure deployed using an exemplar cable system with a pull-chain near front windshield.

Turning now to the drawings, FIGS. 1-7 illustrate one example of a custom-designed body-panel roof-canopy 8 and roof-canopy multi-functional supports 12 and 40 following the inventive principles. Roof-canopy 8, roof-canopy back-supports 12, and bottom body-panel 48 are contemplated as a one-piece structure, referred to as a body-panel design which is formed either as single molded piece or formed in multiple pieces attached to each other on the cart, to provide a sleek aerodynamic look to the cart. Alternatively and depending on the style of the cart in question, either one of or both the roof-canopy 8 and roof-canopy back-supports 12 sections may be added to a cart. The roof-canopy/roof-canopy support structure also could be molded as a single-piece unit. According to the inventive principles, roof-canopy 8 offers previously under-utilized space that is offered either has a channeled space under the roof made possible by the roof-canopy design that has its perimeter area uplifted to form wide C-channels about its perimeter, or alternatively the entire roof-canopy is domed further enhancing the amount of useful space, or is otherwise elevated where desired, providing dedicated out-of-the-way storage space 6 for items such as, protective-enclosures 24 (as illustrated in FIG. 5) when they are undeployed, as illustrated in FIG. 3. The inventive principles also provide for dedicated out-of-the-way storage space under the elevated roof-canopy 8 for the mounting structure (not shown) of protective-enclosures 24. One example of such mounting structure is brackets that can now be located under the canopy out of the way of a user's ingress or egress from the cart. In currently available carts, he brackets that support the protective-enclosure rollers, because they either extend down from the cart's roof-canopy, or out from the cart's roof-canopy, or both pose a hindrance, at best, and a hazard, at worse, for those entering or exiting the cart. This happens because available cart roof-canopies are currently designed to slant downwards at their edges. This design leaves little room under the roof-canopy for either the hardware required to support and store the enclosures and from the rolled-up enclosures themselves as they protrude downwards from beneath the edge of the roof-canopy and must be avoided by those entering or exiting the cart. The inventive design of the roof-canopy eliminates the downward slant of the perimeter edges of the roof-canopy. The perimeter areas of the roof-canopy now are either parallel to the horizontal providing for a channel of space beneath perimeter edges of the roof-canopy or, if desired, domed or otherwise elevated, providing even more space for storage under the periphery of the roof-canopy. This increased storage space within the roof-canopy offers out-of-the-way positioning of the cart's side protective-enclosure brackets and rollers and out-of-the-way storage of the protective-enclosures when they are not is not in use. The protective-enclosures roller supports, which are contemplated to include support structures such as brackets or male/female fitting structure, will no longer pose a hindrance or hazard to those who are entering or exiting the cart. Having the protective-enclosure roller and the protective-enclosures tucked up under the newly designed dome-like canopy also eliminates the need for the off-the-canopy valences that are currently required to cover the undeployed protective-enclosures and their supporting structure. Optionally, protective-enclosure 24 mounting structure is an aperture within the underside of the roof-canopy structure for receiving mating support hardware of protective-enclosure support rollers 22. It is to be appreciated that regardless of which type of mounting structure is chosen, the importance of this innovation is that no mounting structure protrudes out of or down from under roof-canopy 8 as do the brackets and mounting structure on currently available carts. The roof-canopy is supported on the multi-functional roof-canopy back supports that are sited either in-line with the cart's structural struts or encompass the structural struts. Siting roof-canopy back supports 12 either in-line with the cart's structural struts or having roof-canopy back supports 12 encompassing the struts results in widening the space between the supports which provides an enlarged space between the supports. This increase of space between the roof-canopy back supports provides for an increase in the size of what is considered the rear-window, thus enhancing a driver's rear view and also provides more storage space for golf-bags and the like.

Figure 6:
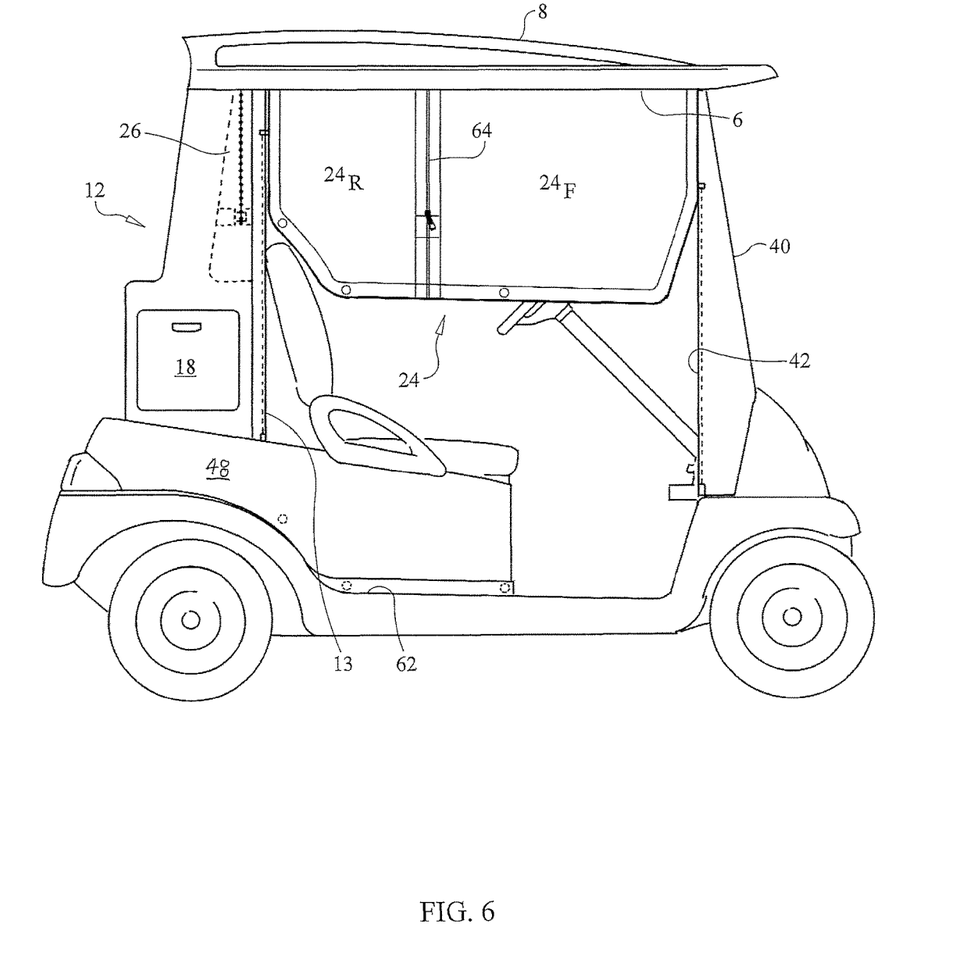
FIG. 6 is a side elevation view of a cart with protective-enclosures partially deployed using an exemplar cable system with a pull-chain near rear windshield.

FIG. 2 illustrates a functional roof-canopy, roof-canopy back-support, rear-canopy body-panel assemblage. FIG. 1 illustrates the driver's and passenger's side pull chains 26, that are used to deploy and undeploy protective-enclosures 24, before they are housed in upper section 15 of roof-canopy back supports 12 as Illustrated in FIG. 2. Deployed protective-enclosures 24 are illustrated in FIG. 5 and FIG. 6. Deployed protective-enclosures 24 are undeployed, in this example, by manually rolling and unrolling driver's and passenger's side rollers 22 to which the protective-enclosures are respectively attached. The rolling mechanism in the illustrated example is manual, but it is to be understood that rolling mechanisms also are available as a powered device and is available in the present invention. In FIG. 5 pull chain 44 is illustrated in the side-front of the cart. Looking at FIG. 6 it can be appreciated that passenger's side protective-enclosure 24 is provided in two sections, front section $24_F$ and rear section $24_R$ connected to each other, in this example, by zipper closure 64. Not shown, but is to be appreciated, is that the driver's side protective-enclosure, in this example, is constructed in the same manner. Although, front section $24_F$ and rear section $24_R$ are connected or disconnected, in this example, using zipper 64, other methods to connect and disconnect the two protective-enclosure sections are contemplated in the present inventive principles, such as, snaps, hook and loop or magnetic systems, for example.

When deployed, the side edges of side protective-enclosures of currently available carts are attached to the cart using various means, such as snaps, magnets, etc. The gaps between each of these attachment means are very susceptible to the entrance of wind, snow, and particularly rain. When the enclosure's attachment gaps are lifted away from the cart by ill-fitting attachment means or by the wind, the interior of the cart and thus the occupants are at the mercy of the effects of the weather. This can be especially troublesome when the cart is in motion subjecting the protective-enclosures to both ambient and motion-caused wind and rain. To alleviate this inconvenience, the inventive concept principles extend to using U-style channels on a forward facing face of the roof-canopy back supports to provide grasping means to hold taut side protective-enclosures when they are deployed. FIG. 1 illustrates this process; the rear-side edge 66 of rear section $24_R$ of protective-enclosures 24 and the front-side edge 68 of front section $24_F$ (see FIG. 5) are edge-treated by, in this example, having cabled edges 28 that are illustrated as stand-alone cables. Cabled-edges 28 of both the front and rear sections of the protective-enclosures fit into canopy-support U-channels 13 and 42 (indicated in FIG. 6) as the protective-enclosure is deployed and secures the enclosure so that it remains taut while in use. U-channels 13 and 42 in this design are integrated into canopy-supports 12 and 40, respectively, as illustrated in FIG. 6. Depending on the structural design of each cart, the U-channels may be placed into a special canopy-to-cart piping. Protective enclosure 24 partially deployed and secured with it cabled-edges held by rear U-channel 13 of canopy support 12 and with canopy roller pull chain 42 situated in the front roof support of the cart are illustrated in FIG. 6. Note that is this example, the roof-canopy back supports 12 are structured to be in-line with the rear roof support struts of the cart. FIG. 5 illustrates the cart with its protective enclosure 24 fully deployed and with the edge-treated rear-side edge 66 of rear section $24_R$ of protective-enclosures 24 and the edge-treated front-side edge 68 of front section $24_F$ securely positioned within U-channels 13 and 42, respectively to be held taut against cart 10 while the enclosures are deployed. If desired, the bottom-most portion of protective-enclosure 24 is secured to the cart by, in this example, either snaps or magnets 62.

Rear-canopy 30, also referred to as a bag cover, provides protection from the elements for golf-bags and their contents but, the present Inventor recognized that while the rear-canopies protect the golf-clubs and other rear accessories of a golf cart, there is no protection for an undeployed rear-canopies. The present inventive concept presents a built-in protective storage space for undeployed rear-canopies. Rear canopy 30 is illustrated in its stored position in FIGS. 2, 4, and 7. On the rear-ward facing side of each of the roof-canopy back supports there is a roof-canopy storage U-channel 31 that accommodates the vertical sides undeployed rear-canopy 30. Complementing and connecting to the two U-channels on the roof-canopy back supports is a space under the roof-canopy 35 that accommodates the horizontal side of undeployed rear-canopy 30. Together, then, these three spaces provide storage area for the undeployed accordion-folding rear-canopy. Securing rear-canopy 30 in its storage area is a handle latch, which in this example is a magnetic latch. One or more magnets 33 are positioned on a rear surface of the roof-canopy or the frame of the cart or the magnetic metal may be part of the cart's structure. Another magnet 32 is positioned on the lower bar of the accordion-folding rear-canopy so that once the rear-canopy is folded-up into its undeployed position, the two magnets act together to securely hold the rear-canopy in place. As described in the Summary Section above, the handle/latch need not be magnetic and may even be just a handle and not a latch if securing the read-canopy in its closed position is accomplished without a latch. Currently available rear-canopies are secured in their undeployed, folded-up condition by means of a hook and loop-type fasteners. Hook and loop fasteners tend to collect bits of debris which eventually limits their usefulness. They also can rub against the material of the rear-canopy which causes wear. Snaps are also used by some currently available canopy styles to secure them while in their undeployed position. The present invention, differs however, in that it is uses magnetic canopy closures including a magnet on the rear-canopy and either a mating magnet on the roof-canopy or the metal of the roof-canopy structure to keep the rear-canopy securely closed. Magnets do not wear out as do hook and loop fasteners and snaps. They also do not harm the cloth of the canopy as can hook and loop fasteners and snaps.

In the example illustrated, rear-canopy 30, is attached to rear-canopy supports 12 by pivotable attachments in accepting devices 36 (see FIG. 2). It should be understood that any means used to attach the rear-canopy to the cart is contemplated by the present invention as long as it performs the required functions. Rear-canopy (bag covers) 30 is typically folded closed in some fashion when it is not being and opened when needed for their protective function. Another important feature provided by the presently customized design of roof-canopy 8 and multi-function roof-canopy supports 12, and not provided by any currently available cart, is the greatly increased width and height of the viewing area of the rear window when rear-canopy (bag cover) 30 is undeployed (see FIG. 2 and FIG. 4). When rear-canopy 30 is undeployed (see FIGS. 2, 4 and 7) the rear window viewing area is significantly increased over any currently available cart. This feature increases the safety of the occupants of the cart as the driver now has a greatly enhanced rear window viewing space.

In the example of the canopy illustrated here, flap 56 is structurally part of roof-canopy 30. Flap 56 provides protection for the contents of storage area 50. In the example of the canopy illustrated here, flap 56 that hangs from the lower bar of accordion-style folding rear-canopy 30 is tucked into the canopy's storage space along with the canopy when the rear-canopy is undeployed. Alternative, if fitting the flap within canopy's storage space is not desired, it is stowed under the undeployed rear-canopy. This is accomplished by using mating magnetic fasteners that provide the advantages of being unlikely under normal circumstance to lose their magnetic force, do not rust, and do not negatively affect either the canopy cover or the canopy flap. In this example, one magnetic fastener is sewn into the driver's side area of flap and another magnetic fastener is sewn into the passenger's side area of flap so that when the flap is tucked under the canopy the two magnets will mate with the metal of the roof-canopy frame. With the flap stowed out of sight the area of unobstructed vision out of the rear cart is greatly increased. Moreover, when flap 56 is lifted and stowed, it eases removal of golf clubs from the storage space 50 for golf clubs or of any other items stowed in sweater basket area 60 and having flap 56 stowed, protects the flap from the wear and tear it can suffer when items are being removed from the rear storage area.

The increased distance between rear-canopy supports 12, additionally, provides extra storage area, which in the example illustrated provides room for amenities such as sand and seed box 18 and cooler 20 within the lower portion 14 of canopy supports 12, with additional space that also can be utilized as a sweater or other storage space 52 without any loss of golf-bag support space 50. Such features, as a seed-box and cooler, are provided either as built-ins or as features to be added at a later date. The uniquely designed rear-canopy supports 12 include drain channels 16 with drainage openings 17 located on roof-canopy 8 providing a through-way for water on the roof-canopy to drain through channels 16. On the rear end of roof-canopy 8 there are optional lights 38 (see FIG. 2) and magnetic closure latch 33 (see FIG. 2) that accepts mating closure latch 32 (see FIG. 2) on rear-canopy 30 when rear-canopy 30 is undeployed. As discussed, above, magnetic latches provide the advantage of being unlikely under normal circumstance to lose their magnetic force, do not rust, and do not negatively affect the bag-cover. Not illustrated in FIG. 1 is any electronic wiring that may be needed for canopy accessories such as canopy lights 38 and, if desired, for a powered mechanism for undeploying and deploying the protective-enclosure and the bag-cover.

Figure 7:
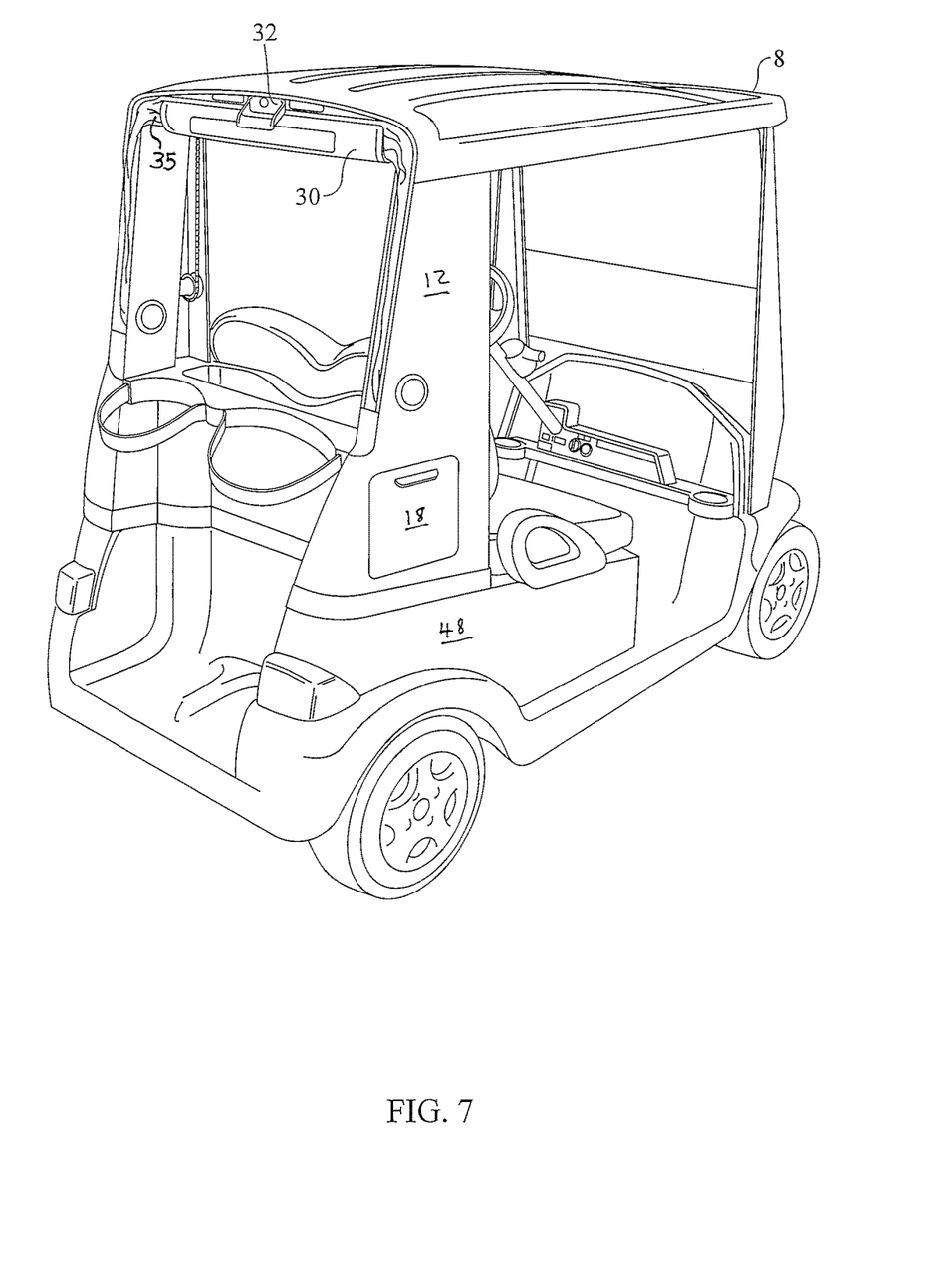
FIG. 7 is a ¾ perspective rear view of an exemplar cart following the principles of the current invention.

Roof-canopy 8 and canopy-supports 12 and 40 are contemplated to be constructed of sheet steel, aluminum, and plastic or fiber glass. If sheet metal is used the metal is cut to size in a sheet metal shear, a machine that cuts it with giant scissors. It is then fed into a roll forming machine, which shapes the metal by passing it over contoured forming rolls. If fiber glass is the chosen material, the canopy is manufactured in one piece by inserting layers of resin-coated fiber glass in a mold and allowing them to harden. U-channels 13 and 42, in the illustrated design, are integrated into canopy-supports 12 and 40 to accept the cabled-edges of protective-enclosures 24. However, depending on design requirements for other carts, the U-channels may be situated into a special canopy-to-cart piping or panel. A cart having roof-canopy 8 and rear-canopy 30 is thus formed with a streamlined structure having a seamless aerodynamically shaped canopy line, as is illustrated in FIG. 7.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods, as described above, of making the embodiments of the invention described herein without departing from the spirit and scope of the invention. Furthermore, it is within the invention concept and invention principle to include all the variations, methods, modifications, and combinations of features within the scope of the appended claims. The invention is limited only by the claims.

What is claimed is:

1. A multi-functional body-panel golf-cart, comprising:
a roof-canopy having a canopy perimeter area,
roof-canopy back supports,
side protective-enclosures,
rollers,
brackets,
said roof-canopy having roof-canopy storage channels under said roof canopy's perimeter area,
said side protective-enclosures supported on said rollers attached to said golf-cart within said storage channels by said brackets or by receiving apertures,
said storage channels shielding said rollers, said brackets and said side protective-enclosures causing them not to extend beyond or below said roof-canopy providing for hazard free entering into or exiting from the golf-cart and eliminating the need for roof-canopy valances.

2. The multi-functional body-panel golf-cart, as recited in claim 1 having a rear-most section and a seat, wherein each of said roof-canopy back supports is supported on a body panel that extends from the rearmost of the golf-cart to under the seat.

3. The multi-functional body-panel golf-cart, as recited in claim 1, wherein said rear roof-canopy supports are in-line with, encompass, or share the function of rear structural struts of said golf-cart providing an enlarged space between the roof-canopy back-supports imparting an increase in a viewing area and for built-in accessories while still providing space for golf-bags.

4. The multi-functional body-panel golf-cart, as recited in claim 2, wherein said roof-canopy supports include vertically oriented front U-channels to grip corresponding edges of deployed said protective-enclosures assuring secure closure of said protective-enclosures.

5. The multi-functional body-panel golf-cart, as recited in claim 2, further comprising said roof-canopy and said roof-canopy supports formed as a single unit.

6. The multi-functional body-panel golf-cart, as recited in claim 2, further comprising said roof-canopy and said roof-canopy supports formed as separate units.

7. The multi-functional body panel golf-cart, as recited in claim 2, further comprising said roof-canopy, said roof-canopy supports and said body panel are formed as a single unit.

8. The multi-functional body-panel golf-cart, as recited in claim 1 wherein said golf-cart has a rear-golf-cart area, wherein said roof canopy further comprises a rear-canopy providing protection for the rear-golf-cart area when deployed.

9. The multi-functional body-panel golf-cart, as recited in claim 8, wherein said rear canopy is stored when undeployed within rear-U-channels of each of said roof-canopy back supports and a space under a rear perimeter section of said roof-canopy contiguous with said rear-U-channels.

10. The multi-functional body-panel golf-cart, as recited in claim 9, wherein said rear canopy is secured in its storage position by a handle/latch.

11. The multi-functional body-panel golf-cart, as recited in claim 10, wherein said handle/latch comprises a magnet closure that includes a magnet on the roof-canopy or frame of the cart and a mating magnet mounted on said rear-canopy.

12. The multi-functional body-panel golf-cart, as recited in claim 1, wherein said roof canopy has an aperture causing water to drain from the roof-canopy to the ground through a drainage channel within each of said roof-canopy back supports.

13. A multi-functional body-panel golf-cart, comprising:
a roof-canopy having a canopy perimeter area,
roof-canopy front supports,
roof-canopy back supports,
side protective-enclosures,
rollers,
brackets,
said roof-canopy having roof-canopy storage channels under said roof canopy's perimeter area,
said side protective-enclosures supported on said rollers attached to said golf-cart within said storage channels by said brackets or by receiving apertures,
said storage channels shielding said rollers, said brackets and said side protective-enclosures causing them not to extend beyond or below said roof-canopy providing for hazard free entering into or exiting from the golf-cart and eliminating the need for roof-canopy valances.

14. A multi-functional body-panel golf-cart, comprising:
a roof-canopy having a canopy perimeter area,
a rear-canopy, and
roof-canopy back supports wherein said rear canopy is stored when undeployed within rear-U-channels of each of said roof-canopy back supports and a space under a rear perimeter section of said roof-canopy contiguous with said rear-U-channels.

15. The multi-functional body-panel golf-cart, as recited in claim 14, wherein said roof canopy further comprises having roof-canopy storage channels under said roof canopy's perimeter area.

16. The multi-functional body-panel golf-cart, as recited in claim 14, wherein said canopy back supports each have a lower portion which provide a storage area.

17. The multi-functional body-panel golf-cart, as recited in claim 16, wherein said rear canopy is secured in its storage position by a magnet closure.

18. The multi-functional body-panel golf-cart, as recited in claim 17, wherein said magnet closure comprises a magnet on the roof-canopy and a mating magnet mounted on said rear-canopy.

19. The multi-functional body-panel golf-cart, as recited in claim 18, further comprising rear roof-canopy supports which are in-line with, encompass, or share the function of rear structural struts of said golf-cart providing an enlarged space between the roof-canopy back-supports imparting an increase in a viewing area and for built-in accessories while still providing space for golf-bags.

20. The multi-functional body-panel golf-cart, as recited in claim 19, further comprising protective-enclosures; and wherein said roof canopy supports include vertically oriented front U-channels to grip corresponding edges of deployed said protective-enclosures assuring secure closure of said protective-enclosures.

* * * * *